(12) United States Patent
Valestin et al.

(10) Patent No.: US 11,102,873 B1
(45) Date of Patent: Aug. 24, 2021

(54) LIGHTING SYSTEM CONFIGURATION

(71) Applicant: Rockwell Collins, Inc., Cedar Rapids, IA (US)

(72) Inventors: Jason J. Valestin, Cedar Rapids, IA (US); Clifford R. Klein, Marion, IA (US); Michael J. Nielsen, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/502,468

(22) Filed: Jul. 3, 2019

(51) Int. Cl.
| | |
|---|---|
| *H05B 47/175* | (2020.01) |
| *G06F 3/0481* | (2013.01) |
| *B64F 5/60* | (2017.01) |
| *B64D 47/06* | (2006.01) |
| *B64D 45/00* | (2006.01) |
| *G06F 3/0482* | (2013.01) |
| *H05B 47/155* | (2020.01) |

(52) U.S. Cl.
CPC .......... *H05B 47/175* (2020.01); *B64D 45/00* (2013.01); *B64D 47/06* (2013.01); *B64F 5/60* (2017.01); *G06F 3/0482* (2013.01); *G06F 3/04817* (2013.01); *H05B 47/155* (2020.01); *B64D 2045/0085* (2013.01)

(58) Field of Classification Search
CPC ....... H05B 47/175; H05B 47/155; B64F 5/60; B64D 45/00; B64D 47/06; B64D 2045/0085; G06F 3/04817; G06F 3/0482
See application file for complete search history.

(56) References Cited

U.S. PATENT DOCUMENTS

| | | | | |
|---|---|---|---|---|
| 2006/0288377 | A1* | 12/2006 | Hsieh | H04N 21/4325 725/76 |
| 2007/0046670 | A1* | 3/2007 | Hedrick | G01C 23/00 345/440 |
| 2009/0267538 | A1* | 10/2009 | Mantovani | H05B 47/175 315/297 |
| 2015/0338722 | A1* | 11/2015 | Bonnier | G03B 15/07 362/4 |
| 2016/0004374 | A1* | 1/2016 | Kneuper | B64D 43/00 345/173 |
| 2017/0217590 | A1* | 8/2017 | Godecker | B64D 11/00153 |

* cited by examiner

*Primary Examiner* — Seth A Silverman
(74) *Attorney, Agent, or Firm* — Suiter Swantz pc llo

(57) ABSTRACT

A system and related method provide an ability at a local level to develop and modify an aircraft lighting configuration. Local maintenance may modify and replace a lighting configuration file associated with an aircraft lighting control defining default values and preset intensities for interior, exterior, cabin, and cargo bay lighting. A Graphical User Interface (GUI) offers a maintenance technician and a crew-member efficient flight deck control of each zone and field enabling efficient user control of each aspect of aircraft lighting.

13 Claims, 15 Drawing Sheets

| Feature Name | Left Console Edge Lights - Dimming Entry |
|---|---|
| Type (Selection/Status) | Selection (Data Entry) ASCII or Integer |
| Inputs | NVIS_Mode_StateInt_Mode_DAY_BtnInt_Mode_NIGHT_BtnInt_Mode_OFF_BtnLeft_Zone_Dim_IncrementLeft_Zone_Dim_Decrement     Internal<br>Internal<br>Internal<br>Internal<br>Internal<br>Internal |
| Outputs | Zone 1 (see "Zone_Intensity_Outputs" tab)     Based on config file |
| Figure Ref | Figure 1 |
| General Description | Provides dimming control of the left console edge/backlights. Exact implementation will be defined by the OEM via a loadable configuration file. |
| Graphical Description | Enumerations: OFF*, [10%, 20%, 30%, 40%, 50%, 60%, 70%, 80%, 90%, 100%]^, [NVIS]^*The OFF enumeration is enabled via the config file when if the "OFF Capable" is enabled. ^ The whether Dimming Values [10%-100%] are shown vs. [NVIS] is based on if the "NVIS Lock" config file parameter is set and NVIS_Mode_State = Enabled. If [NVIS] is the only selectable enumeration, then NVIS will be displayed and the field will be disabled. Label: ANN Units: None GUI Component: Enumerated Data Entry |

FIG. 6A

| | |
|---|---|
| Representation | Readout indication color:<br>-Selected State: Cyan<br>-Non-selected State: Cyan<br>-Disabled State: Gray<br>-Caution/Miscompare State: Yellow<br>Font: Medium font |
| Filtering | N/A |
| Resolution | N/A |
| Hysteresis/Rounding | N/A |
| Max Value | Defined by config file |
| Min Value | Defined by config file |
| Default Value | Defined by config file |
| Flashing | None |
| Logic | When the Console_LFT_Edge_Dim_Value is changed, then each "Channel" and "Discrete" child under the "Zone_Dim" attribute will be output based on the appropriate value listed in the configuration file.<br>See the "Zone_Intensity_Outputs" tab for more information on how the outputs are set based on the configuration file; along with a listing of how to handle Special conditions. |

FIG. 6B

| | |
|---|---|
| Special | When the Int_Mode_DAY_Btn is pushed, then the Console_LFT_Edge_Dim_Value will be set to "Day Preset" parameter value. When the Int_Mode_NIGHT_Btn is pushed, then the Console_LFT_Edge_Dim_Value will be set to "Night Preset" parameter value. When the Int_Mode_OFF_Btn is pushed, then the Console_LFT_Edge_Dim_Value will be set to "Off Preset" parameter value. When the Left_Zone_Dim_Increment is detected, the Console_LFT_Edge_Dim_Value will increment to the next value (if the field can be incremented). When the Left_Zone_Dim_Decrement is detected, the Console_LFT_Edge_Dim_Value will decrement to the next value (if the field can be decremented). When the NVIS_Mode_State is enabled, then the Console_LFT_Edge_Dim_Value will be set to "NVIS Preset" parameter value. When the NVIS_Mode_State is disabled, then the Console_LFT_Edge_Dim_Value will be reverted back to the value that was set prior to the NVIS_Mode_State transitioning to enabled. If a response to any of the channel command to the LCB associated with this zone are not received in 3 seconds, the readout will be considered a miscompare and will be colored yellow. |

FIG. 6C

Configuration File Content

| Parameter | Maximum number of occurrences |
|---|---|
| Zone_Dim | 20 (one for each GUI dimming zone) |
| Zone_Toggle | 2 (one for each GUI toggle zone) |
| Channel | 66* (one for each available LCB channel; however there may be duplicate rows when defining normal vs. NVIS outputs) |
| Discrete | 2 (one for each discrete output) |

Configuration File Attribute Definitions

Zone_Dim,<Zone Name>,<Zone Number>,<OFF capable>,<NVIS Lock>,<Default>,<Day Preset>,<Night Preset>,<Off Preset>,<NVIS Preset>

Zone_Toggle,<Zone Name>,<Zone Number>,<Default>,<Day Preset>,<Night Preset>,<Off Preset>,<NVIS Preset>

Channel,<Channel Name>,<Channel Number>,<GRN/WHT Transition>,<NVIS/Non-NVIS Transition>,<NVIS Specific Values>,<Fade Profile>,<OFF>,<10%>,<20%>,<30%>,<40%>,<50%>,<60%>,<70%>,<80%>,<90%>,<100%>

Discrete,<Discrete Name>,<Discrete Number>,<OFF>,<10%>,<20%>,<30%>,<40%>,<50%>,<60%>,<70%>,<80%>,<90%>,<100%>

FIG. 7

| | |
|---|---|
| Description: | This attribute defines a listing of parameters that are used to configure the setting of the Lighting Format GUI |
| Type: | ASCII |
| Size: | Total Max Size: 55 Characters (56 total with <LF>) |
| Parameters | Each of the parameters is defined in subsequent sub-sections:<br><Zone Name><br><Zone Number><br><OFF Capable><br><NVIS Lock><br><Default><br><Day Preset><br><Night Preset><br><Off Preset><br><NVIS Preset> |
| Example: | Zone_Dim,LH CONSOLE LIGHT,1,0,0,100,100,40,-10 |

Zone_Dim attribute

FIG. 8

| Zone_Name attribute | |
|---|---|
| Description | Description: Name of the zone being configured. Not used by the software but helps to identify the zone being configured. |
| Type | ASCII |
| Size | Size: Total Max Size: 20 Characters |
| Valid Characters: | ASCII string, (alphanumeric special characters "~", " ", "_", ".", "0x20") Notes: There should not be duplicate Zone Names in the configuration file. Special Characters are allowed for the Zone Name. |
| Range: | ASCII character (01 – 20) |
| Example: | Zone_Dim,LH CONSOLE LIGHT,1,0,0,100,100,40,~,10 |

FIG. 9

| Zone Numbers | |
|---|---|
| Zone Name | Zone Number |
| LEFT CONSOLE EDGE | 1 |
| CTR CONSOLE EDGE | 2 |
| RIGHT CONSOLE EDGE | 3 |
| FWD CONSOLE EDGE | 4 |
| OVHD CONSOLE EDGE | 5 |
| LEFT CONSOLE ANN | 6 |
| CTR CONSOLE ANN | 7 |
| RIGHT CONSOLE ANN | 8 |
| FWD CONSOLE ANN | 9 |
| OVHD CONSOLE ANN | 10 |
| LEFT GLARESHIELD | 11 |
| L CTR GLARESHIELD | 12 |
| CTR GLARESHIELD | 13 |
| R CTR GLARESHIELD | 14 |
| RIGHT GLARESHIELD | 15 |
| CTR CONSOLE FLOOD | 16 |
| AFT CABIN | 17 |
| LEFT FOOTWELL | 21 |
| RIGHT FOOTWELL | 22 |
| DSC Out | 12A |
| DSC Out | 12B |

FIG. 10

In the ALS file after each parameter label and its associated data a line feed <LF> at the end of each line:

Zone_Dim,LEFT CONSOLE EDGE,1,0,1,100,100,40,10,10
Channel,LCB1 - (5V PWM),1,0,0,0,0,6554,13107,19660,26214,32768,39321,45874,52428,58982,65535
Channel,LCB1 - (5V ANLG),3,0,0,0,0,6554,13107,19660,26214,32768,39321,45874,52428,58982,65535
Zone_Dim,CTR CONSOLE EDGE,2,0,0,100,100,40,10,10
Channel,LCB1 - (5V PWM),5,0,0,0,0,6554,13107,19660,26214,32768,39321,45874,52428,58982,65535
Channel,LCB1 - (5V ANLG),6,0,0,0,0,6554,13107,19660,26214,32768,39321,45874,52428,58982,65535
Zone_Dim,RIGHT CONSOLE EDGE,3,0,0,100,100,40,10,10
Channel,LCB2 - (5V PWM),25,0,0,0,0,6554,13107,19660,26214,32768,39321,45874,52428,58982,65535
Channel,LCB2 - (5V ANLG),27,0,0,0,0,6554,13107,19660,26214,32768,39321,45874,52428,58982,65535
Zone_Dim,FWD CONSOLE EDGE,4,0,1,100,100,40,10,10
Channel,LCB3 - (5V PWM),49,0,0,0,0,6554,13107,19660,26214,32768,39321,45874,52428,58982,65535
Channel,LCB3 - (5V PWM),50,0,0,0,0,6554,13107,19660,26214,32768,39321,45874,52428,58982,65535
Zone_Dim,OVHD CONSOLE EDGE,5,0,1,100,100,40,10,10
Channel,LCB3 - (5V PWM),53,0,0,0,0,6554,13107,19660,26214,32768,39321,45874,52428,58982,65535
Zone_Dim,LEFT CONSOLE ANN,6,0,0,100,100,40,10,10
Channel,LCB1 - (28V ANLG),4,0,0,0,0,6554,13107,19660,26214,32768,39321,45874,52428,58982,65535
Channel,LCB1 - (28V ANLG),4,0,0,1,0,0,15331,15331,15331,15331,15331,15331,15331,15331,15331
Zone_Dim,CTR CONSOLE ANN,7,0,0,100,100,40,10,10
Channel,LCB1 - (28V ANLG - LPCAP),7,0,0,0,0,17085,22469,27852,33235,38618,44002,49385,54768,60152,65535
Channel,LCB1 - (28V ANLG - LPCAP),7,0,0,1,0,0,1170,2340,3511,4681,5851,7021,8191,9362,10532,11702
Channel,LCB1 - (28V ANLG),8,0,0,0,0,6554,13107,19660,26214,32768,39321,45874,52428,58982,65535
Channel,LCB1 - (28V ANLG),8,0,0,1,0,0,15331,15331,15331,15331,15331,15331,15331,15331,15331
Discrete,MKP 1 DIM,1,1,1,1,1,1,0,0,0,0,0
Zone_Dim,RIGHT CONSOLE ANN,8,0,0,100,100,40,10,10
Channel,LCB2 - (28V ANLG - LPCAP),31,0,0,0,0,17085,22469,27852,33235,38618,44002,49385,54768,60152,65535
Channel,LCB2 - (28V ANLG - LPCAP),31,0,0,1,0,0,1170,2340,3511,4681,5851,7021,8191,9362,10532,11702
Discrete,MKP 2 DIM,2,1,1,1,1,1,0,0,0,0,0
Zone_Dim,FWD CONSOLE ANN,9,0,0,100,100,40,10,10

FIG. 11A

LIGHTING SYSTEM CONFIGURATION

STATEMENT REGARDING FEDERALLY SPONSORED RESEARCH AND DEVELOPMENT

The inventive concepts disclosed herein were made with government support under PO 1115013 awarded by The United States Department of Defense. The government has certain rights in the inventive concepts disclosed herein.

BACKGROUND

Aircraft lighting may be vital to aviation safety. Pilots must be able to visualize each instrument and console during all phases of flight. Nearby aircraft must be able to visualize each other to avoid collision. During startup, bright lights may enable the flight crew to carry out preflight tasks. Enroute at night, dim or colored lights may be required to allow unobstructed external view maintaining pilot's night vision. In combat, night vision friendly lighting may enable mission success.

Traditional lighting configurations may require pilot action for each specific light control to dim or brighten each light to a desired illumination. This activity may require pilot attention away from a higher priority task.

Some traditional lighting configurations maintain a factory default light level too dim, too bright, or an incorrect color which may preclude safe or efficient flight operation. These traditional configurations may require manufacturer action to alter a factory setting requiring costly and time-consuming change.

Therefore, a need remains for a system and related method which may overcome these limitations and provide a novel solution for lighting system configuration enabling an operator action to change a default configuration and single user action to manage a light level in each specific zone.

SUMMARY

In one aspect, embodiments of the inventive concepts disclosed herein are directed to A system for aircraft lighting configuration. The system may comprise a data concentrator, a user display in data communication with the data concentrator, a lighting control in data communication with the data concentrator, an aircraft lighting suite in data communication with and controlled by at least one channel within the lighting control. Here, each light of the aircraft lighting suite may have an intensity. The data concentrator may further include a controller and a memory in data communication with the controller, the memory coupled with a maintenance interface, and a graphical user interface (GUI) displayed on the user display, the GUI produced by and in data communication with the controller.

In embodiments, the memory may include a configuration file which defines at least one lighting configuration, the configuration file writable via the maintenance interface. The memory may include a tangible, non-transitory memory configured to communicate with the controller, the tangible, non-transitory memory having instructions stored therein that, in response to execution by the controller, cause the controller to execute the commands of the system.

The system may instantiate a user-control application configured to couple a field within the GUI with at least one light of the aircraft lighting suite via one of the channels. The system may also receive, from the GUI, a lighting configuration command from a user and extract from the configuration file, at least one attribute definition associated with the lighting configuration command. Here, the system may control, via the at least one channel, the intensity of at least one light of the aircraft lighting suite based on the lighting configuration command and the configuration file.

A further embodiment of the inventive concepts disclosed herein may include a method for aircraft lighting configuration. The method may include receiving, from a graphical user interface (GUI), a lighting configuration command, mapping a GUI field with at least one light of an aircraft interior and exterior lighting suite via at least one channel, extracting from a configuration file, at least one attribute definition associated with the lighting configuration command, and controlling, via at least one channel, an intensity of at least one light of an aircraft lighting suite based on the lighting configuration command and the at least one attribute definition.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIGS. 6A-6C are diagrams of a table of exemplary local configuration file definitions in accordance with one embodiment of the inventive concepts disclosed herein;

FIG. 7 is a diagram of an exemplary specifications for a configuration file content and attribute definitions in accordance with one embodiment of the inventive concepts disclosed herein;

FIG. 8 is a diagram of an exemplary specification for a zone dim attribute associated with one embodiment of the inventive concepts disclosed herein;

FIG. 9 is a diagram of an exemplary specification for a zone name attribute associated with one embodiment of the inventive concepts disclosed herein;

FIG. 10 is a diagram of an exemplary listing of zone numbers associated with one embodiment of the inventive concepts disclosed herein;

FIGS. 11A and 11B are diagrams of an exemplary configuration file associated with one embodiment of the inventive concepts disclosed herein.

DETAILED DESCRIPTION OF EXEMPLARY EMBODIMENTS

Figure 1:
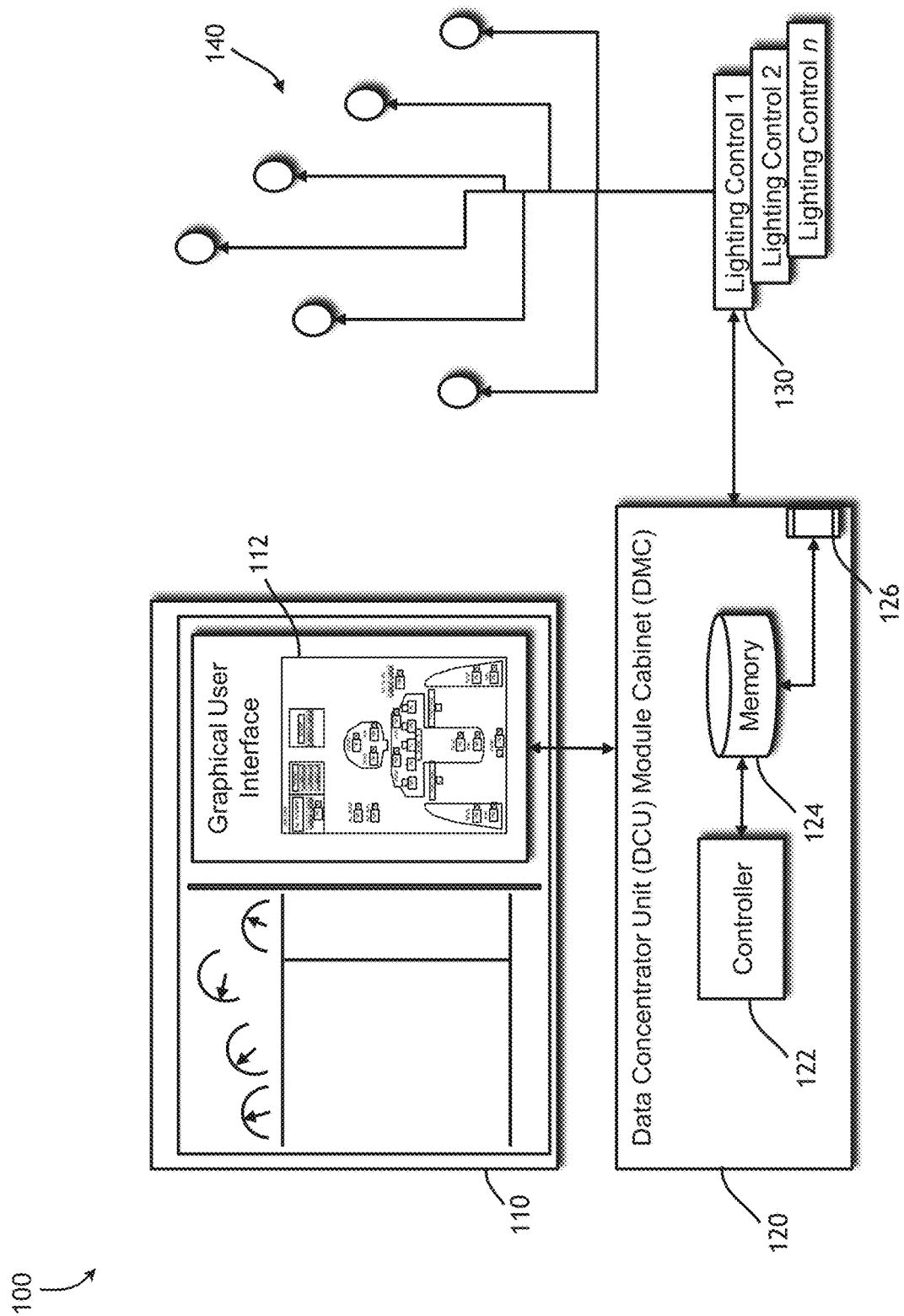
FIG. 1 is a diagram of a system hardware layer exemplary of an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and related method provide an ability at a local level to develop and modify an aircraft lighting configuration. Local maintenance may modify and replace a lighting configuration file associated with an aircraft lighting control defining default values and preset intensities for interior, exterior, cabin, and cargo bay lighting. A Graphical User Interface (GUI) offers a maintenance technician and a crewmember efficient flight deck control of each zone and field enabling efficient user control of each aspect of aircraft lighting

| REFERENCE CHART | |
|---|---|
| 100 | System Hardware |
| 110 | Flight Deck Display |
| 112 | Graphical User Interface (GUI) |
| 120 | DMC |
| 122 | Controller |
| 124 | Memory |
| 126 | Maintenance Interface |
| 130 | Lighting Controls 1, 2, n |
| 140 | Aircraft Lighting Suite |
| 200 | Software Layer |
| 222 | User Control Application |
| 224 | Configuration File |
| 226 | Channel Output |
| 300 | Multi-Function Display |
| 400 | GUI Diagram Dual |
| 412 | GUI Dual Flight Deck Layout |
| 420 | Master Control |
| 422 | Int Mode DAY Btn |
| 424 | Int Mode NIGHT Btn |
| 426 | Int Mode OFF Btn |
| 428 | Left Zone Dim |
| 430 | Center Zone Dim |
| 432 | Right Zone Dim |
| 440 | Color Mode Toggle |
| 450 | Flood Control |
| 452 | CTR Console Flood Dim |
| 454 | Console OVHD Edge Dim |
| 456 | Console OVHD ANN Dim |
| 460 | Glareshield and Console |
| 462 | Glare LCTR Dim |
| 464 | Glare CTR Dim |
| 466 | Glare RCTR Dim |
| 468 | Glare LFT Dim |
| 470 | Console FWD Edge Dim |
| 472 | Console FWD ANN Dim |
| 474 | Glare RGT Dim |
| 476 | Console LFT Edge Dim |
| 478 | Console LFT ANN Dim |
| 480 | Footwell LFT Toggle |
| 482 | Console CTR Edge Dim |
| 484 | Console CTR ANN Dim |
| 486 | Footwell RGT Toggle |
| 488 | Console RGT Edge Dim |
| 490 | Console RGT ANN Dim |
| 500 | GUI Diagram Single |
| 512 | GUI Single Flight Deck Layout |
| 514 | All Edge Dim |
| 516 | All ANN Dim |
| 518 | All Glare Dim |
| 520 | All Interior/Exterior Control |
| 522 | All On |
| 524 | All Off |
| 526 | All Dim |
| 530 | Preset |
| 532 | Day Preset |
| 534 | Night Preset |

-continued

REFERENCE CHART

| | |
|---|---|
| 536 | OFF Preset |
| 542 | Color White |
| 544 | Color Green |
| 546 | Color NVG |
| 560 | Glareshield Controls |
| 566 | Glare Dim |
| 570 | Console LFT |
| 580 | Console RT |
| 596 | Cabin Dim |
| 598 | Cargo Bay Control |
| 600 | Configuration File Settings |
| 700 | Configuration File Specifications |
| 800 | Zone Dim Specification |
| 900 | Zone Name Specification |
| 1000 | Zone Numbers |
| 1100 | Exemplary Configuration File |
| 1200 | Method Flow |

FIG. 1 System Hardware

Referring to FIG. 1, a diagram of a system hardware layer exemplary of an embodiment of the inventive concepts disclosed herein is shown. Broadly, the system 100 may comprise a flight deck display 110, a data concentrator 120, a lighting control 130, and an aircraft lighting suite 140.

In one embodiment of the inventive concepts disclosed herein, the flight deck display 110 may comprise a Multi-Function Display (MFD) installed within a flight deck of an aircraft. For example, a transport category aircraft may have one or more MFDs on a forward panel. Similarly, a fighter aircraft may maintain one or more MFDs on the forward panel or an up-front control. The flight deck display 110 may function to display a plurality of pilot selectable data including a Graphical User Interface (GUI) 112 on a portion of the MFD.

In one embodiment, the data concentrator 120 may be comprised of a Data Concentrator Unit (DCU) Module Cabinet (DMC). The data concentrator 120 may include a controller 122, a memory 124, and a maintenance interface 126. The controller 122 may include one or more processors which carry out commands included with a tangible, non-transitory memory configured to communicate with the controller, the tangible, non-transitory memory having instructions stored therein that, in response to execution by the controller, cause a processor within the controller to carry out the steps of the system 100. The maintenance interface 126 may include a serial port, a coaxial port, an ethernet port, and a universal serial bus (USB) port to enable a function of the maintenance interface 126 to allow an operator to load a newly edited configuration file to the memory 124.

As used herein, a user may be defined as a person able to interact with the GUI during system operation. An operator may be defined as one managing a maintenance of the aircraft within which the system 100 may be installed.

In one embodiment of the inventive concepts disclosed herein, the lighting control 130 may function to receive a digital command from the data concentrator 120 and translate the digital command to a voltage level on a specific channel. The specific channel may then be coupled with one or more lights within the aircraft lighting suite 140. In embodiments, multiple lighting controls 130 may include a first, a second, and an n number of lighting controls.

In one embodiment of the inventive concepts disclosed herein, the aircraft lighting suite 140 may include each light available to an aircrew to accomplish a mission. The aircraft lighting suite 140 may comprise a glareshield light as well as a footwell light. In embodiments, the aircraft lighting suite 140 may include a flight deck lighting suite, an exterior lighting suite, a cabin lighting suite, a cargo bay lighting suite, and a weapons bay lighting suite.

Figure 2:
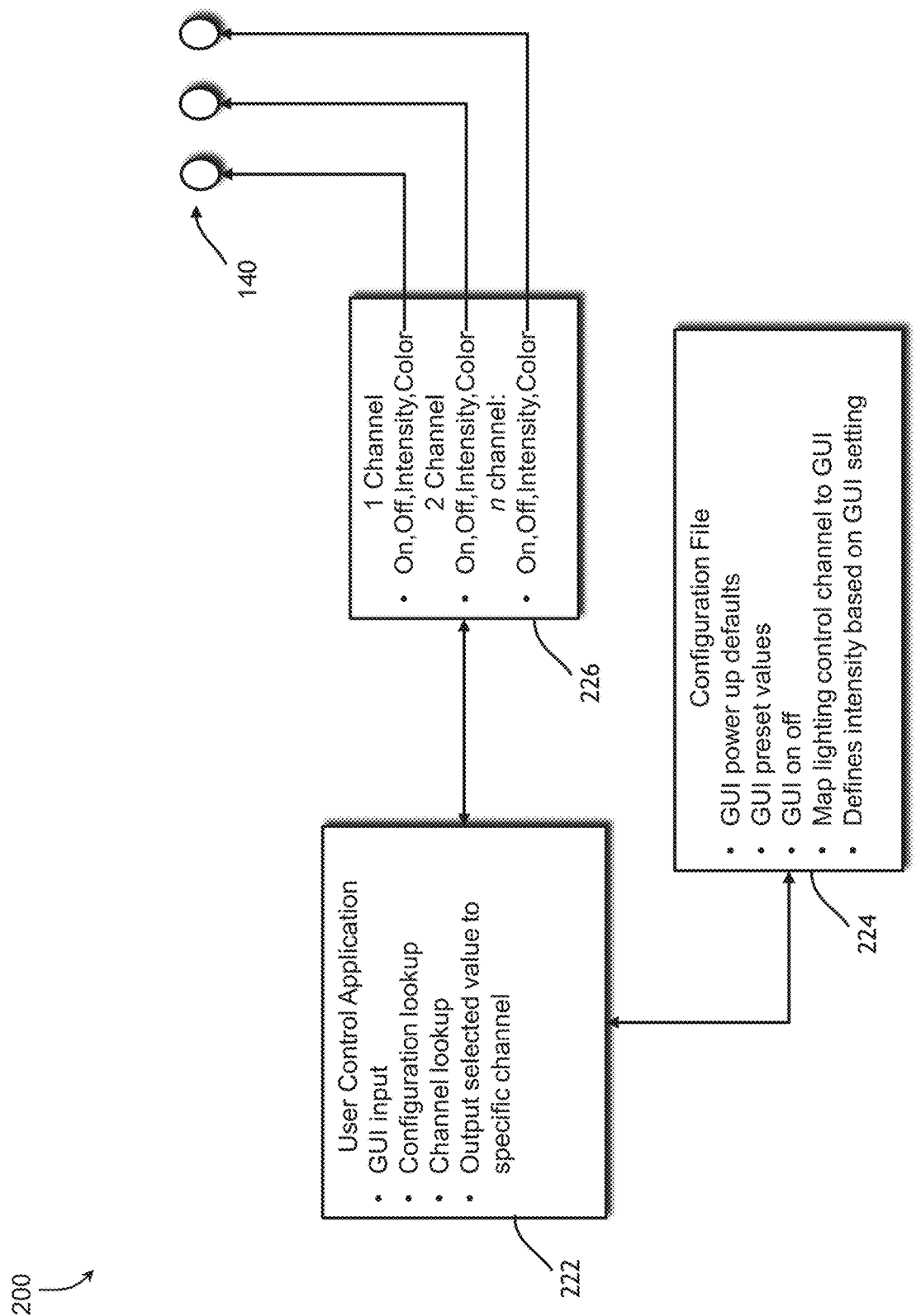
FIG. 2 is a diagram of a system software layer exemplary of an embodiment of the inventive concepts disclosed herein.

FIG. 2 System Software

Referring now to FIG. 2, a diagram of a system software layer exemplary of an embodiment of the inventive concepts disclosed herein is shown. Broadly, the software layer 200 of the system 100 may include a user control application 222, a configuration file 224, and a channel output 226 working in concert to illuminate one or more of the lights within the aircraft lighting suite 140.

In one embodiment of the inventive concepts disclosed herein, the user control application 222 may operate on one or more processors within the controller 122 based on instructions stored on the memory 124. The controller 122 may generally command each function via the user control application 222 running on a processor.

In embodiments, the configuration file 224 may exist within the memory 124 and define a plurality of attributes which define how the GUI 112 functions as well as how each GUI 112 function may couple with an individual light or a group of lights within the aircraft lighting suite 140. The configuration file 224 may also define a GUI 112 default value on power up, a GUI 112 preset value (e.g., day night off), and an on/off status of the GUI 112. It may map a lighting control channel to each GUI 112 field and define the intensity level and color output based on each GUI 112 setting.

The configuration file 224 may function to set parameters on each one of the individual fields of the GUI 112. An operator may edit the configuration file 224 at the local level and then upload the edited configuration file to the memory 124 via the maintenance interface 126 port. For example, should an operator determine one or more lights is of an inconvenient or inhibiting intensity, the operator may edit the configuration file 224 via a text editor and storable within the memory via the maintenance interface, upload the new configuration file 224 to the memory 124, and the system 100 will operate in accordance with the newly edited configuration file 224. Using the standardized configuration format found in a uniform specification, the user may apply individual changes to individual fields of the configuration file 224 and tailor the configuration file 224 to the operator's desired illumination and color outputs of each light within the aircraft lighting suite 140. This would enable a dynamic operator defined configuration file 224 offering the operator the ability to dynamically (during maintenance operations) change lighting levels.

The channel output 226 may operate within the lighting control 130 and receive a digital input from the user control application 222 and function to translate the digital input to a specific voltage sent to a specific light in the aircraft lighting suite 140 via a specific channel.

System Function

Generally, the system 100 may function to receive a user input via the GUI 112 and illuminate one or more lights within the aircraft internal lighting suite 140 based on the definitions found in the configuration file 224.

In embodiments, the controller 122 may instantiate the user control application 222 to receive an input from the user via the GUI 112, lookup a desired user configuration from the configuration file 224, lookup a channel to which the user may desire a specific lighting intensity, and couple a field within the GUI 112 to output the select value to the specific channel for light illumination of one or more of the desired lights of the aircraft lighting suite 140.

In one embodiment of the inventive concepts disclosed herein, as a user may change a setting within the GUI 112, the controller 122 may look up an intensity value in the configuration file 224 based on the GUI 112 setting. Also, the controller 122 may also lookup to which channels the new intensity may apply and output the selected intensity value to each channel within the channel output 226. In one embodiment of the inventive concepts disclosed herein, the output lighting intensity may be on, off, a percentage of a full intensity value, and color.

The controller 122 may be configured to map a field within the GUI 112 with at least one light of the aircraft lighting suite 140 via the at least one channel within the channel output 226. The controller 122 may receive, from the GUI 112, a lighting configuration command and extract from the configuration file 224, at least one attribute definition associated with the lighting configuration command.

The controller 122 may control, via the mapped channel, the intensity (e.g., on, off, intensity, color) of at least one light of the aircraft lighting suite 140 based on the lighting configuration command and each definition of an attribute found the configuration file 224. For example, the user may select an exemplary "day" setting within the GUI 112, the controller 122 may then extract from the configuration file 224 a definition of the day command and send to each channel defined by the configuration file 224 which channels may illuminate and levels of intensity of each light within the aircraft lighting suite 140.

FIG. 3 MFD

Figure 3:
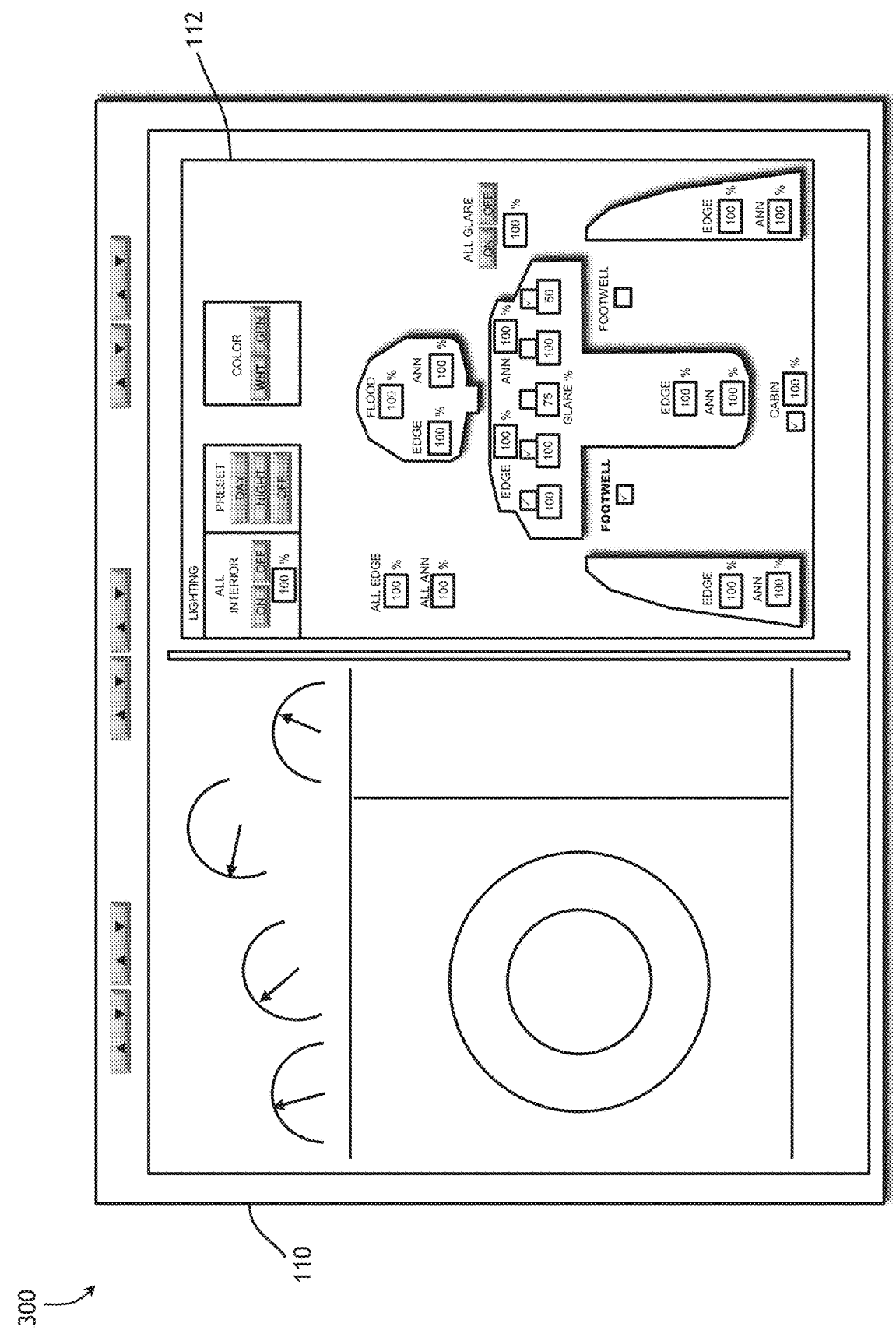
FIG. 3 is a diagram of a multi-function display exemplary of an embodiment of the inventive concepts disclosed herein.

Referring now to FIG. 3, a diagram of a multi-function display exemplary of an embodiment of the inventive concepts disclosed herein is shown. A multi-function display (MFD) 300 may include a plurality of pilot selectable displays and pages from which the pilot may desire pertinent information. In one embodiment of the inventive concepts disclosed herein, the GUI 112 may be pilot selected for display on the MFD.

FIG. 4 GUI Dual

Figure 4:
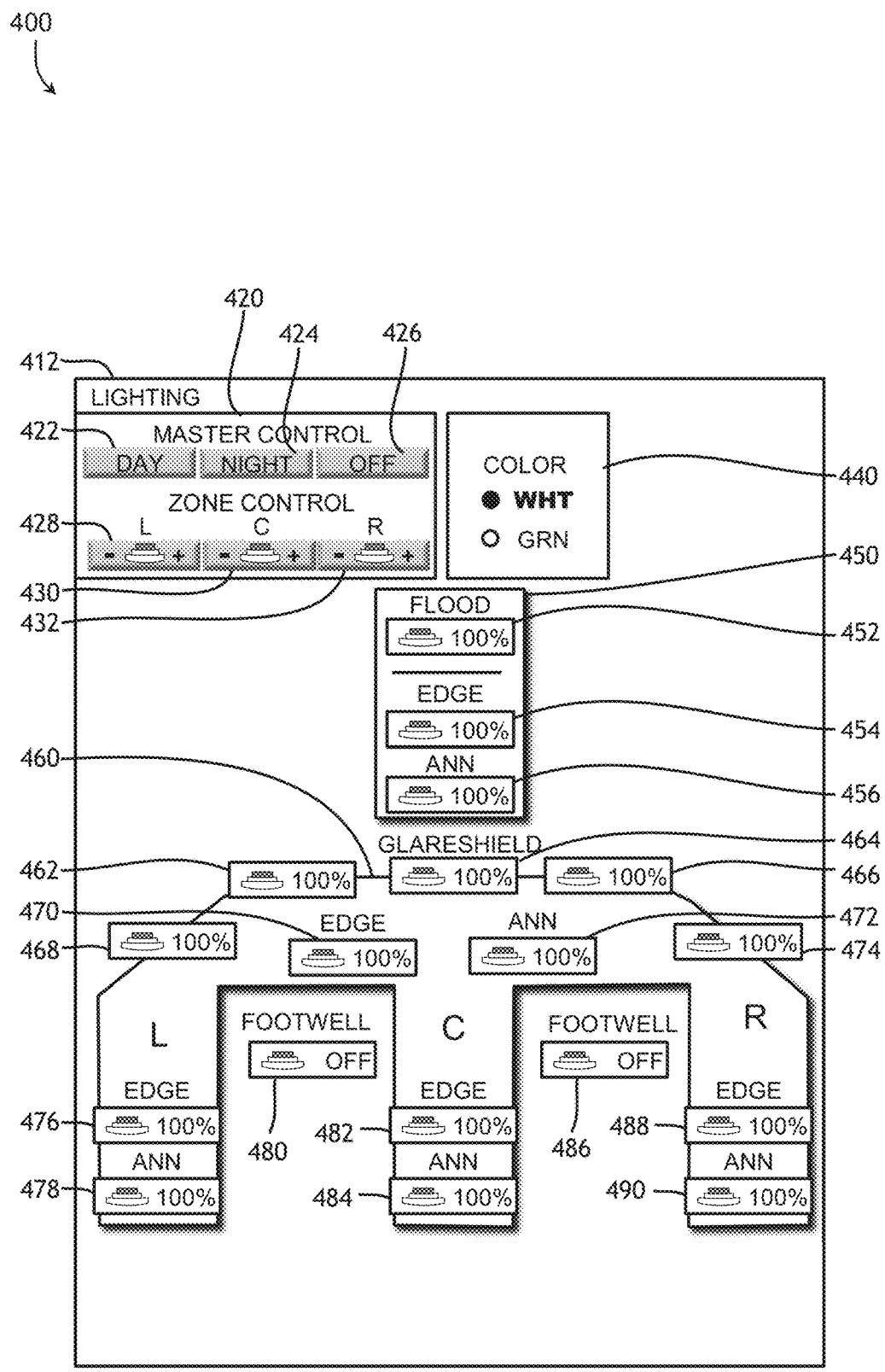
FIG. 4 is a diagram of one GUI exemplary of one embodiment of the inventive concepts disclosed herein.

Referring now to FIG. 4, a diagram of one GUI exemplary of one embodiment of the inventive concepts disclosed herein is shown. A dual GUI diagram 400 may indicate an example GUI 112 and associated fields available to the user. User selection of each field within the GUI 112 may command an associated definition in the configuration file 224 defining a lighting function of the GUI field. A GUI dual flight deck layout 412 may enable a flight deck with two pilots to each select the GUI 112 on an associated MFD (left or right MFD). In addition, embodiments may include an ability for contemporaneous display of the GUI 112 on each flight deck display 110 (left and right) at the same time. A master control 420 may control all lights defined by the configuration file 224. An initialization (INT) mode day Button (BTN) 422, INT mode night BTN 424, and an INT mode off BTN 426 may initialize the selected modes of the aircraft lighting suite 140. A left zone dim 428, a center zone dim 430, and a right zone dim 432 may dim each of the selected zones of the aircraft lighting suite 140. A color mode toggle 440 may command a color should the aircraft lighting suite 140 be equipped with colorable Light Emitting Diodes (LED). Interior flood lights may be controlled by fields labeled flood control 450, a Center (CTR) console flood dim 452, a console Overhead (OVHD) edge dim 454, and a console OVHD ANN dim 456.

Fields defining individual panels may include a glareshield and console 460, a glare Left Center (LCTR) dim 462, a glare CTR dim 464, a glare Right Center (RCTR) dim 466, a glare Left (LFT) dim 468, and a glare Right (RGT) dim 474. Fields defining console lights may include a console Forward (FWD) edge dim 470, a console FWD Annunciator (ANN) dim 472, On the left side, a console LFT edge dim 476 and a console LFT ANN dim 478 may control those lights, the center may include a console Center (CTR) edge dim 482, and a console CTR ANN dim 484, while the right may include a console RGT edge dim 488 and a console RGT ANN dim 490. Fields defining footwell lights may include a footwell LFT toggle 480 and a footwell RGT toggle 486.

FIG. 5 GUI Single

Figure 5:
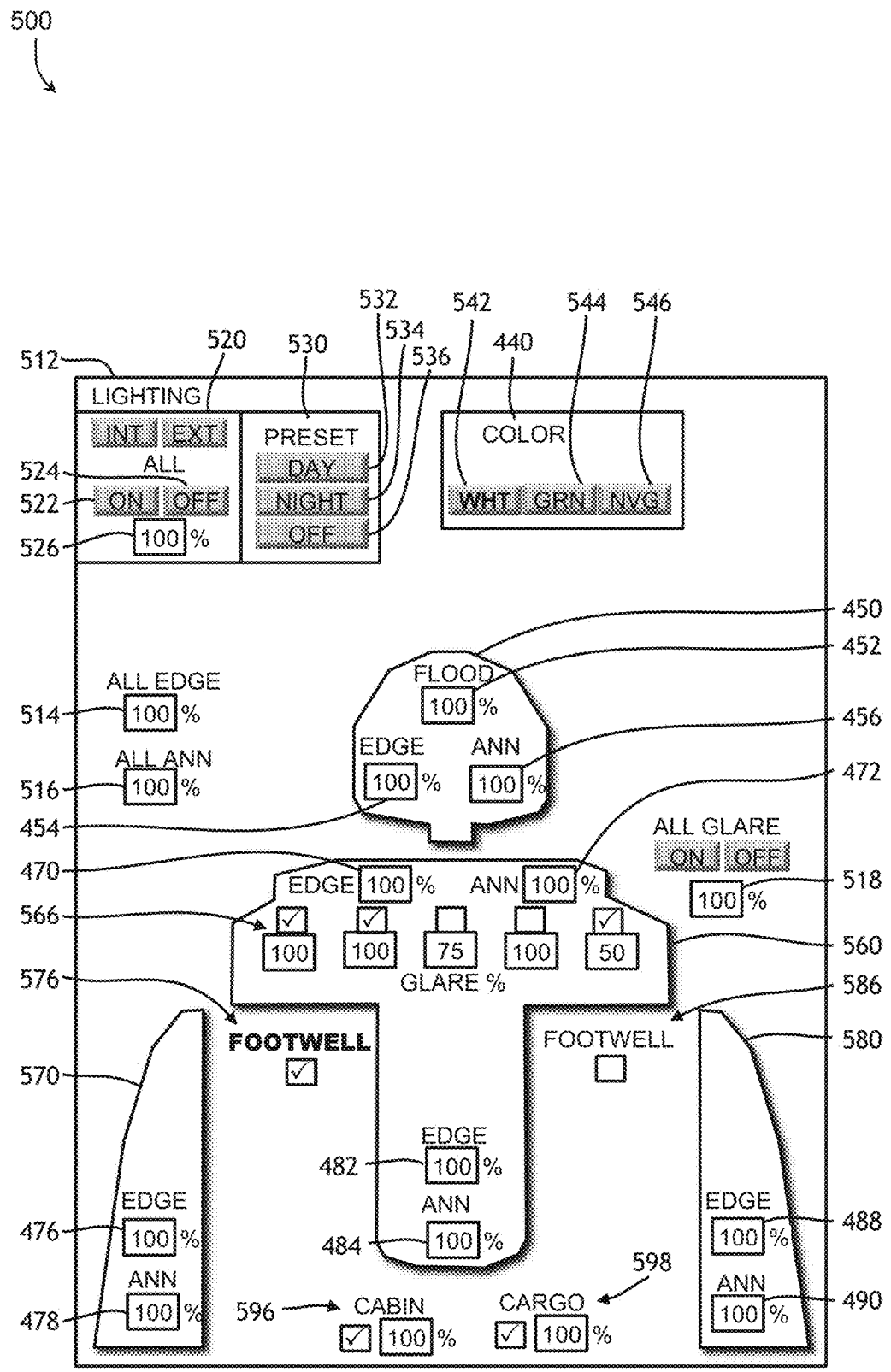
FIG. 5 is a diagram of one GUI exemplary of one embodiment of the inventive concepts disclosed herein.

Referring now to FIG. 5, a diagram of one GUI exemplary of one embodiment of the inventive concepts disclosed herein is shown. A single pilot GUI diagram 500 may indicate many similar but some additional fields associated with a single piloted aircraft. A GUI single flight deck layout 512 may an all interior/exterior control 520 field including an all on 522, an all off 524, and an all dim 526. Contemplated herein, a NVIS control may be included here to allow a user selection of an NVIS mode of interior and exterior lighting. A preset 530 field may include a day preset 532, a night preset 534, and an OFF preset 536. In one embodiment, the OFF preset 536 may be replaced with a Default (DFLT) preset.

Within the color control 440, a color white 542, a color green 544, and a color NVG 546 may command the appropriate color.

To control edge intensity, an all edge dim 514 and an all ANN dim 516 may command the edge lights while an all glare dim 518 may control glareshield lights.

A plurality of Glareshield Controls 560 may include a glare dim 566 and the 470 and the 472. each console may include a console LFT 570 and a console RT 580. For cabin and cargo bay intensity, the GUI single flight deck layout 512 may include a cabin dim 596 and a cargo dim 598.

FIG. 6A-6C Configuration File Definitions

Referring now to FIGS. 6A-6C, diagrams of a table of exemplary local configuration file definitions in accordance with one embodiment of the inventive concepts disclosed herein is shown. A feature name may define which zone or individual light is associated with the configuration file attribute. Here, a console LFT edge dim 476 may be defined in the following fields of the configuration file 224. A Type may include which text characters may be readable by the user control application 222.

An Inputs field may include a Night Vision Illumination System (NVIS) Mode State, an INT Mode DAY BTN, an INT Mode NIGHT BTN, an INT Mode OFF BTN, a Left Zone Dim Increment, and a Left Zone Dim Decrement.

An Outputs field may include one or more zones of lighting including a zone 1 here. In embodiments, one zone may function to control an interior lighting suite, another zone may control a cabin lighting suite, an yet another zone may control an exterior lighting suite. A Figure Reference may determine which figure within the GUI 112 may be defined by the appropriate field. Here, the console LFT edge dim 476 may be found in FIG. 4. A General Description may provide a text definition of the action of the field.

A Graphical Description may define what graphics are displayed to the user on the GUI 112 while a Representation (FIG. 6B) may include a definition of a color and font attribute of the GUI 112 field.

A Filtering field and a Resolution field may define how a GUI 112 filed may be presented to the user. A Hysteresis/Rounding field may include factors such as a selection lag and a shape of the GUI 112 field presentation. A series of value definitions may include a Max Value a Min Value, and a Default Value of the intensity of the lighting zone. A Flashing definition may indicate whether the GUI 112 field may flash as it is selected by the user. A Logic definition may include how the controller 122 may function as the GUI 112 field is selected.

A Special field (FIG. 6C) may include additional details in text format concerning action during user selection of the specific GUI 112 field.

FIG. 7 Configuration File Specification

Referring now to FIG. 7, a diagram of an exemplary specifications for a configuration file content and attribute definitions in accordance with one embodiment of the inventive concepts disclosed herein is shown. A specification diagram 700 may indicate definitions of required fields within the configuration file 224. A parameter of a content of the configuration file 224 may include a zone_dim parameter defining a dim zone for each GUI dimming zone. A zone_toggle definition may define a toggle for each GUI toggle zone. A channel definition may include an exemplary 66 channels with additional channels for NVIS selections. A discrete definition may include two, with one for each output. A configuration file 224 attribute definition may include a zone_dim, a zone_toggle, a channel, and a discrete field to define each attribute.

In one embodiment of the inventive concepts disclosed herein, the attribute definition may further comprise a zone dim attribute including a zone name, a zone number, an off capable, a NVIS lock, a default, a day preset, a night preset, an off preset, and a NVIS preset.

FIG. 8 Zone Dim

Referring now to FIG. 8, a diagram of an exemplary specification for a zone dim attribute associated with one embodiment of the inventive concepts disclosed herein is shown. A zone_dim specification diagram 800 may define each associated attribute. The configuration file 224 may include the zone_dim attribute for every dimming zone within the GUI 112. This may define each GUI 112 setting. The zone_dim attribute may allow for at least one child channel or discrete attribute associated with each zone_dim attribute. A description field may textually describe a function of each field within the zone_dim attribute. A type field may include a type of text available to edit the field. A size definition may indicate a character limit. Here, an exemplary 56 total with a line feed (LF) may be allowable to the editor. A listing or parameters may include those parameters which may be defined in following (not pictured) sub-sections. An example field may offer the text editor an example of the text which may allow the controller 122 to properly read the edited configuration file 224.

FIG. 9 Zone Name

Referring now to FIG. 9, a diagram of an exemplary specification for a zone name attribute associated with one embodiment of the inventive concepts disclosed herein is shown. A zone name specification diagram 900 may indicate each field associated with the zone_name parameter. A description field may include a textual description of a function of the zone_name parameter. The type of text here may be ASCII. A size field may define a required number of characters here, 20, A valid characters field may define which of the ASCII characters are functional. A range field may define a character range here 01 through 20. As above the example field may offer the editor an example of a functional string of text.

FIG. 10 Zone Numbers

Referring now to FIG. 10, a diagram of an exemplary listing of zone numbers associated with one embodiment of the inventive concepts disclosed herein is shown. A listing of zone numbers 1000 may include those zones required to be defined within the configuration file 224 to enable proper function. Zone numbers 12A and 12B may maintain discrete output names as opposed to zone numbers. The discrete outputs may allow the operator to configure ground/open discrete zones as part of a zone in cases where a traditional aircraft lighting control lacks an analog dimming bus, and only functions with a discrete input to drive two states (e.g., like day and night). This may be independent of the analog dimming control using the Lighting Control 130.

Figure 11B:

FIG. 11A-11B Example

Referring now to FIGS. 11A and 11B, diagrams of an exemplary configuration file associated with one embodiment of the inventive concepts disclosed herein is shown. An exemplary configuration file 1100 may include each field required to enable the controller 122 to function. An exemplary left console edge line may indicate required text fields readable by the controller 122. A Zone_Dim, LEFT CONSOLE EDGE, 1,0,1,100,100,40,10,10 Channel, Lighting Control (LCB1)—(5V Pulse Width Modulation (PWM)). With a following string of exemplary text defining each GUI 112 field and associated function: 1,0,0,0,0,0,6554,13107, 19660,26214,32768,39321,45874,52428,58982,65535.

FIG. 12 Method

Figure 12:
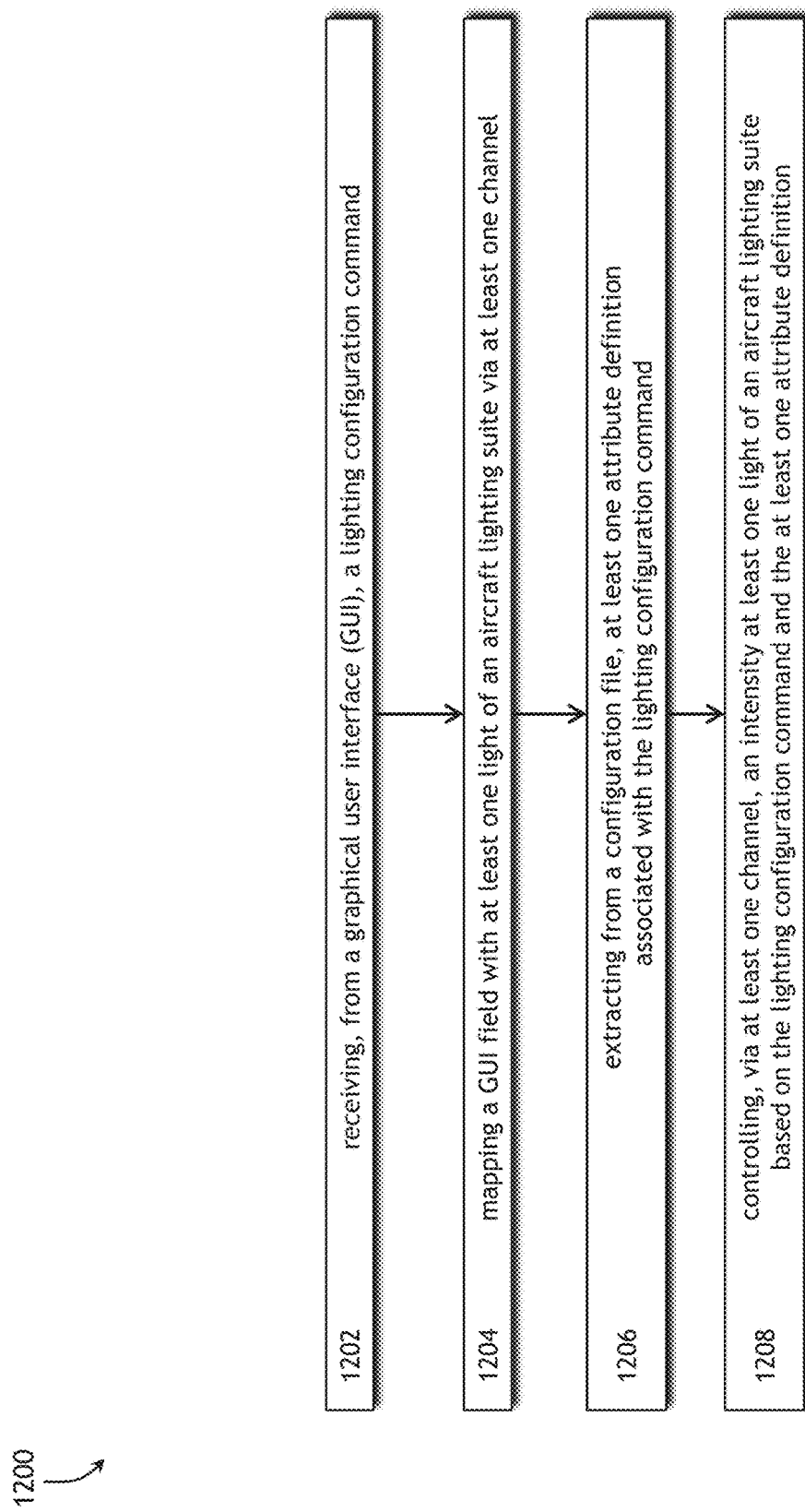
FIG. 12 is a method flow diagram in accordance with one embodiment of the inventive concepts disclosed herein.

Referring now to FIG. 12, a method flow diagram in accordance with one embodiment of the inventive concepts disclosed herein is shown. A method flow 1200 may include plurality of method steps to ensure proper function of the system 100. A step 1202 may include receiving, from a graphical user interface (GUI), a lighting configuration command while a step 1204 may include mapping a GUI field with at least one light of an aircraft lighting suite via at least one channel. A step 1206 may include extracting from a configuration file, at least one attribute definition associated with the lighting configuration command and a step 1208 may include controlling, via at least one channel, an intensity of at least one light of an aircraft lighting suite based on the lighting configuration command and the at least one attribute definition.

CONCLUSION

As will be appreciated from the above description, embodiments of the inventive concepts disclosed herein may provide a novel solution for lighting system configuration enabling an operator action to change a default configuration and single user action to manage a light level in each specific zone.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for aircraft lighting configuration, comprising:
    a data concentrator;
    a user display in data communication with the data concentrator;
    an aircraft flight deck lighting control in data communication with the data concentrator; and
    an aircraft flight deck lighting suite in data communication with and controlled by at least one channel within the aircraft flight deck lighting control, each light of the aircraft flight deck lighting suite having an intensity, the at least one channel controls an intensity of at least one flight deck annunciator light, at least one left flight deck console light, at least one center flight deck console light, and at least one right flight deck console light;
    the data concentrator including a controller and a memory in data communication with the controller, the memory coupled with a maintenance interface; and
    a graphical user interface (GUI) displayed on the user display, the GUI produced by and in data communication with the controller;
    the memory including at least one configuration file which defines at least one lighting configuration, the configuration file writable by an operator via the maintenance interface;
    the memory including a tangible, non-transitory memory configured to communicate with the controller, the tangible, non-transitory memory having instructions stored therein that, in response to execution by the controller, cause the controller to:
        instantiate at least one user-control application, the user-control application configured to couple a field within the GUI with at least one light of the aircraft flight deck lighting suite via the at least one channel;
        receive, from the GUI, a lighting configuration command;
        extract from the configuration file, at least one attribute definition associated with the lighting configuration command; and
        control, via the at least one channel, the intensity of at least one light of the aircraft flight deck lighting suite based on the lighting configuration command and the configuration file.

2. The system for aircraft lighting configuration of claim 1, wherein the data concentrator further comprises a Data Concentrator Unit (DCU) Module Cabinet (DMC).

3. The system for aircraft lighting configuration of claim 1, wherein the user display further comprises a portion of a Multi-Function Display (MFD).

4. The system for aircraft lighting configuration of claim 1, wherein the maintenance interface further comprises at least one of a serial port, a coaxial port, an ethernet port, and a universal serial bus (USB) port.

5. The system for aircraft lighting configuration of claim 1, wherein the GUI further comprises at least one field associated with the at least one channel.

6. The system for aircraft lighting configuration of claim 1, wherein the configuration file is editable via a text editor and storable within the memory via the maintenance interface.

7. The system for aircraft lighting configuration of claim 1, wherein the controller associates a GUI input with the at least one channel via the least one lighting configuration and based on at least one attribute definition within the configuration file.

8. The system for aircraft lighting configuration of claim 7, wherein the at least one attribute includes a zone dim attribute for at least one zone within the GUI.

9. The system for aircraft lighting configuration of claim 1, wherein the intensity further comprises at least one of: an off, a percentage of a full level of brightness, and a Night Vision Illumination System.

10. A method for aircraft lighting configuration, comprising:
    receiving, from a graphical user interface (GUI), a lighting configuration command;
    mapping a GUI field with at least one light of an aircraft flight deck lighting suite via at least one channel, the at least one channel controlling at least one flight deck annunciator light, at least one left flight deck console light, at least one center flight deck console light, and at least one right flight deck console light;
    extracting from a configuration file, at least one attribute definition associated with the lighting configuration command; and
    controlling, via at least one channel, an intensity of the at least one light of the aircraft flight deck lighting suite based on the lighting configuration command and the at least one attribute definition.

11. The method for aircraft lighting configuration of claim 10, wherein the GUI is defined and displayed by a user-control application.

12. The method for aircraft lighting configuration of claim 10, wherein the configuration file is editable via a text editor and storable within a memory via a maintenance interface.

13. The method for aircraft lighting configuration of claim 10, wherein the at least one attribute definition further comprises a zone dim attribute including one of a zone name, a zone number, an off capable, a Night Vision Illumination System (NVIS) lock, a default, a day preset, a night preset, an off preset, and a NVIS preset.

\* \* \* \* \*